US009639651B2

(12) United States Patent
Chen et al.

(10) Patent No.: US 9,639,651 B2
(45) Date of Patent: May 2, 2017

(54) ROUTING METHOD FOR INTEGRATED CIRCUIT AND RELATED INTEGRATED CIRCUIT

(71) Applicant: ALI Corporation, Hsinchu (TW)

(72) Inventors: Liang-Hsin Chen, Hsinchu (TW); Yi-Hsien Cheng, Hsinchu (TW)

(73) Assignee: ALI Corporation, Hsinchu (TW)

( * ) Notice: Subject to any disclaimer, the term of this patent is extended or adjusted under 35 U.S.C. 154(b) by 0 days.

(21) Appl. No.: 14/936,687

(22) Filed: Nov. 10, 2015

(65) Prior Publication Data

US 2016/0275231 A1   Sep. 22, 2016

(30) Foreign Application Priority Data

Mar. 16, 2015 (CN) .......................... 2015 1 0113771

(51) Int. Cl.
*G06F 17/50* (2006.01)

(52) U.S. Cl.
CPC ................................ *G06F 17/5077* (2013.01)

(58) Field of Classification Search
CPC ............. G06F 17/5045; G06F 17/5068; G06F 17/5077; G06F 17/5081; G06F 2217/62
USPC ................... 716/110, 114–115, 120, 126–127
See application file for complete search history.

(56) References Cited

U.S. PATENT DOCUMENTS

| | | | |
|---|---|---|---|
| 2008/0157124 A1* | 7/2008 | Taniguchi | H01L 27/0207 257/203 |
| 2010/0053130 A1* | 3/2010 | Hsu | G09G 3/3688 345/206 |
| 2012/0019969 A1* | 1/2012 | Iwabuchi | H03M 1/08 361/56 |
| 2015/0310153 A1* | 10/2015 | Taskin | G06F 17/5031 716/114 |
| 2015/0349760 A1* | 12/2015 | Frederick, Jr. | H03K 5/02 327/306 |

* cited by examiner

*Primary Examiner* — Paul Dinh
(74) *Attorney, Agent, or Firm* — Winston Hsu; Scott Margo

(57) ABSTRACT

A routing method is illustrated. One exemplary embodiment of the routing method includes: determining a signal path between a signal source and a corresponding receiving terminal according to a routing structure of a system power mesh; determining a routing structure of an independent power mesh that is independent from the system power mesh according to the signal path; and performing a routing process according to the determined routing structure of the independent power mesh and the signal path. The system power mesh and the independent power mesh are respectively coupled to different voltage sources.

12 Claims, 3 Drawing Sheets

ROUTING METHOD FOR INTEGRATED CIRCUIT AND RELATED INTEGRATED CIRCUIT

BACKGROUND OF THE INVENTION

1. Field of the Invention

The present invention relates generally to routing in integrated circuits, and more particularly, to a method and related integrated circuit that improves noise immunity with respect to specific signals in the integrated circuits.

2. Description of the Prior Art

Place and route is an important stage in the design of integrated circuits, which involves placing a variety of active circuit elements and logic gates on the area of the integrated circuit, and followed by routing that adds wires to connect the placed elements and logic gates. Since routing must obey specific design rules and limitations of the semiconductor process, place and route stage is usually complicated. This stage is mostly completed by virtue of automatic placement and routing (APR) tools.

With advances and developments in semiconductor processes, circuit elements in a single integrated circuit have been greatly increased in quantity and density, which increases the workload of the APR tool. Specifically, in order to guarantee the performance of specific circuit elements, and prevent these specific circuit elements from being interfered with, special routing requirements need to be applied. For example, neighboring area around the specific circuit elements needs to be cleared, or no wires are allowed to pass through the top or the bottom of these specific circuit elements.

Besides, signals generated by specific signal sources, such as clock signals, sometimes need special protections. This is because jitters and noises in the clocks signals may undesirably affect performances of high-speed active circuit elements in the integrated circuit. Furthermore, power integrity of a system power/ground mesh varies with status of a load which the power/ground mesh is connected to. For example, in heavy load condition, a voltage supplied by the system power/ground mesh may be shifted, which affects operations of buffers in the integrated circuit. In view of this, the conventional APR tool may not satisfy all the special routing requirements, leading to failure of automatic routing procedure. Hence, there exists a need for providing a solution that improves the conventional routing method.

SUMMARY OF THE INVENTION

With the aforementioned in mind, it is one objective of the present invention to provide routing rules and routing methods, which can be further applied in the APR tools. The present invention disposes an independent power/ground mesh that is independent from the system power/ground mesh, thereby protecting signal transmissions between specific circuits from being interfered with by the noises.

According to a first aspect of the present invention, a routing method for an integrated circuit, comprising: determining a signal path between a signal source and a corresponding receiving terminal according to a routing structure of a system power/ground mesh; determining a routing structure of an independent power/ground mesh that is independent from the system power/ground mesh according to the signal path; and performing a routing process according to the determined routing structure of the independent power/ground mesh and the signal path, wherein the system power/ground mesh and the independent power/ground mesh are respectively coupled to different voltage sources.

According to a second aspect of the present invention, an integrated circuit comprises: a system power/ground mesh, a signal source, a receiving terminal and an independent power/ground mesh. There is a signal path between the receiving terminal and the signal source. The signal path is determined according to a layout of the system power/ground mesh. A layout of the independent power/ground mesh is determined according to the signal path. The system power/ground mesh and the independent power/ground mesh are respectively connected to different voltage sources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
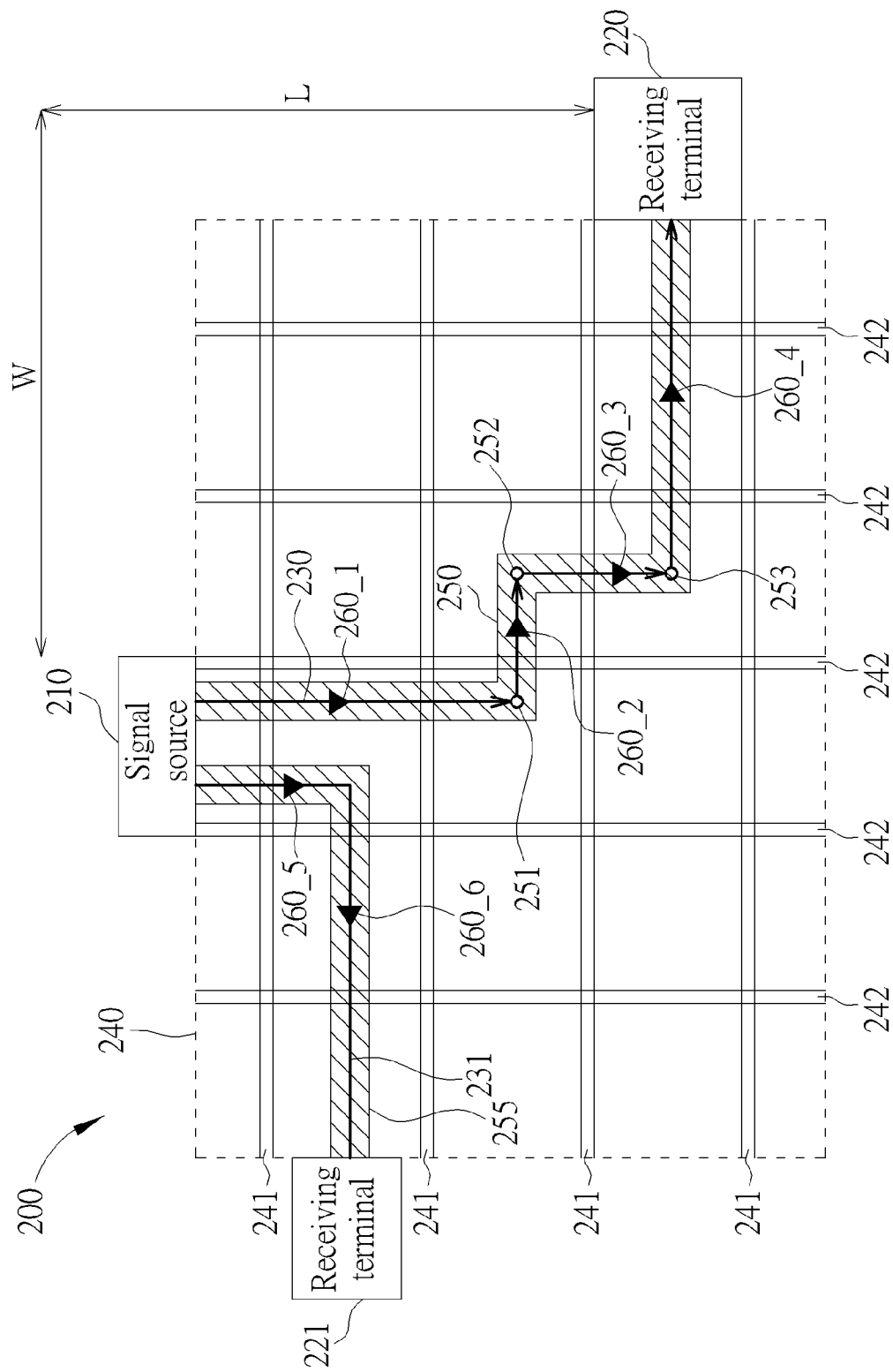
FIG. 1 is a diagram illustrating a layout of an integrated circuit based on a routing method of the present invention.
Figure 2:
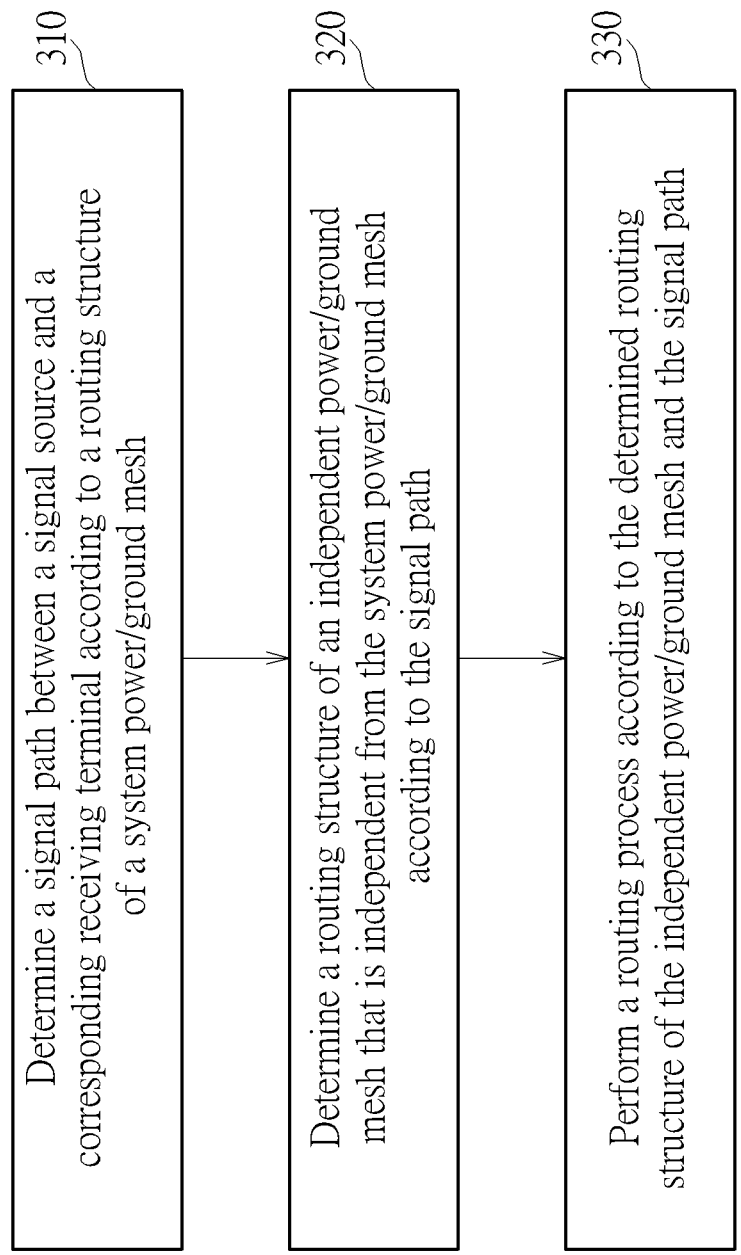
FIG. 2 is a flowchart of a routing method according to one embodiment of the present invention.

Please refer to FIG. 1 in conjunction with FIG. 2. FIG. 2 illustrates a flowchart of a routing method according to one embodiment of the present invention, while FIG. 1 illustrates a layout of an integrated circuit based on the flow of FIG. 2.

In step 310 of the flow, according to a routing structure of a system power/ground mesh of the integrated circuit, determine a signal path between a signal source and a corresponding receiving terminal. Taking an integrated circuit 200 of FIG. 1 as an example, based on arrangement performed by an APR tool, a signal source 210 is placed on a location within an upper region of the integrated circuit 200, while a corresponding receiving terminal 220 is placed on a location within a right region of the integrated circuit 200. Most of circuit elements in the integrated circuit 200 are powered by a system power/ground mesh 240. The system power/ground mesh 240 includes horizontal power/ground lines 241 and vertical power/ground lines 242. Some of horizontal power/ground lines 241 are connected to a system voltage source VDD (not shown), while others are connected to a system ground VSS (not shown). Similarly, some of vertical power/ground lines 242 are connected to the system voltage source VDD, while others are connected to the system ground VSS. Based on locations where the circuit elements of the integrated circuit 200 are placed, the APR tool will situate vias between the power/ground lines 241 or 242 if necessary, and further route the power to these circuit elements. In step 310, the signal path between the signal source and the receiving terminal are routed within blank regions that are not occupied by the system power/ground mesh 240. In the embodiment of FIG. 1, the signal path 230 is routed as shown. The signal path 230 has turning points 251, 252 and 253. The purpose of these turning points 251, 252 and 253 is intended to have the signal path 230 keep away from other circuit elements of the integrated circuit 200, which exist only when necessary. Hence, in other embodiments of the present invention, different number and locations of the turning points on the signal path, other than that are explicitly shown in FIG. 1, are also contemplated.

In one embodiment, after the signal path 230 has been routed, buffers 260_1-260_4 could be placed on the signal path 230 if necessary. The purpose of placing the buffers 260_1-260_4 is intended to drive the signal to be transmitted on the signal path 230. Please note that locations where the buffers are placed and the number of the buffers as shown by FIG. 1 is also not intended to be limitations of the present invention. Moreover, the signal path 230 actually passes through center regions of the integrated circuit 200, and there could be also other circuit elements placed within or in the proximity of these regions in most conditions. These circuit elements could interfere with the buffers 260_1-260_4. Hence, the present invention disposes deep well regions in the substrate (not shown) of the integrated circuit 200 for the buffers 260_1-260_4, in order to avoid noises being coupled to the buffers 260_1-260_4 via the substrate.

Figure 3:
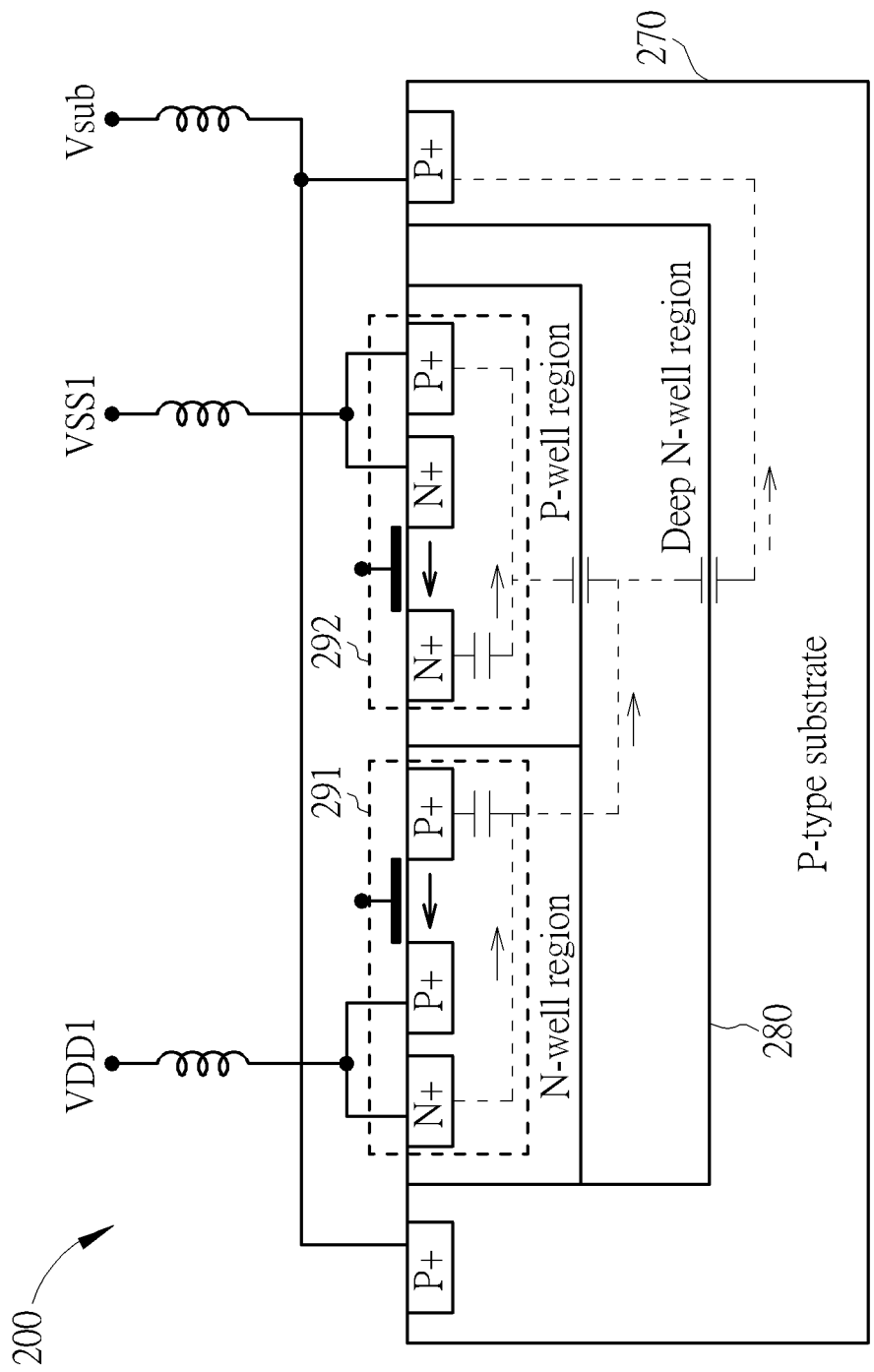
FIG. 3 is a diagram illustrating a cross-section view of an integrated circuit according to one embodiment of the present invention.

FIG. 3 illustrates one embodiment of the present invention, in which one or more deep well region is disposed within a p-type substrate 270 of the integrated circuit 200, with respect to one or more of buffer 260_1-260_4. In FIG. 3, it is assumed that each of the buffer 260_1-260_4 is a complementary MOS (CMOS) that consists of an n-channel metal-oxide-semiconductor field-effect transistor (MOSFET) 292 and a p-channel MOSFET 291. By virtue of the deep n-well region 280, the n-channel MOSFET 292 can be isolated from the p-type substrate 270. This avoids noises or signals from other circuit components (e.g. MOS components in the integrated circuit 200) being coupled to the n-channel MOSFET 292 through the p-type substrate 270. For example, noises or signals may be coupled to p-well region of the n-channel MOSFET 292 through the p-type substrate 270. In addition, the p-channel MOSFETs 291 and the n-channel MOSFETs 292 of the buffers 260_1-260_4 can be powered by an independent voltage source VDD1 and an independent ground voltage source VSS1 that are discrete from the system voltage source VDD and the system ground VSS (which will be illustrated later in further details). As a result, signal quality on the signal path 230 can be guaranteed. Please note that, although the deep n-well region 280 is employed for noise immunity in the above embodiment, other conductive types of deep well regions can be contemplated for noise immunity. For example, according to various embodiments of the present invention, due to the type of semiconductor process employed by the integrated circuit 200, a deep p-well region can be contemplated to isolate a p-channel MOSFET 291 from an n-type substrate. Such modifications should be considered fallen within the scope of the present invention.

Continuing to the flow of FIG. 2, in step 310, after the signal path is determined, the flow starts to route the power to the buffers 260_1-260_4. In order to address the problem that the status of the load affects the stability of the supplied voltage and the operations of the circuit elements, the present invention further disposes an independent power/ground mesh 250 that is independent from the system power/ground mesh 240, such that signal quality on the signal path 230 can be guaranteed. The system power/ground mesh 240 and the independent power/ground mesh 250 are respectively connected to different voltage sources, and provide voltage signals that originate from these different voltage sources to different circuit. For example, the system power/ground mesh 240 supplies the power voltage source VDD and the ground voltage source VSS to the connected circuit elements. The independent power/ground mesh 250 supplies the independent voltage source VDD1 and the ground voltage source VSS1 to corresponding connected circuit elements. Voltage levels of the different voltage sources are basically the same. The independent power/ground mesh 250 could be employed in powering the buffers 260_1-260_4 via corresponding voltage source. Since the power supplied via the independent power/ground mesh 250 and supplied via the system power/ground mesh 240 originates from different voltage sources, the circuit powered by the independent power/ground mesh 250 will not be affected by the status of the load of the system power/ground mesh 240. The independent voltage source VDD1 and the ground voltage source VSS1 supplied to the independent power/ground mesh 250 could be provided by the signal source 210 or the receiving terminal 220 (when the signal source 210 or the receiving end 220 has already been connected to specific steady voltage sources), or provided by other voltage sources that are independent from the system voltage source VDD and the ground voltage source VSS.

In step 320, determine a routing structure of the independent power/ground mesh that is independent from the system power/ground mesh according to the determined signal path. Taking the embodiment of FIG. 1 as an example, the routing structure of the independent power/ground mesh 250 is basically determined according to the signal path 230. In this embodiment, the independent power/ground mesh 250 is substantially aligned with the signal path 230. However, in some embodiments of the present invention, the independent power/ground mesh 250 may only have some parts that are aligned with the signal path 230, but have other parts that are not aligned with the signal path 230 (which must not overlap the system power/ground mesh 240).

Further, as the independent power/ground mesh 250 and the system power/ground mesh 240 are actually formed on the same metal layer, the wiring/tracing of the independent power/ground mesh 250 changes between different layers along with the wiring/tracing of the system power/ground mesh. Specifically speaking, the independent power/ground mesh 250 is also made of horizontal and vertical power/ground lines that are not overlapped. Horizontal system power/ground lines 241 and horizontal independent power/ground lines are located on a same layer, while the vertical system power/ground lines 242 and vertical independent power/ground lines are located on another same layer. However, in view of the structure of the integrated circuit 200, all of the vertical system or the vertical independent power/ground lines and horizontal system or horizontal independent power/ground lines belong to a same metal layer that is close to the top of the integrated circuit 200. Hence, the wiring/tracing of the independent power/ground mesh 250 changes to a different layer for vertical/horizontal switching if the wiring/tracing of system power/ground mesh 240 does change to the different layer for vertical/horizontal switching. In addition, in terms of geometry, lengths of the power/ground lines 241 of the system power/ground mesh 240 are substantially identical in the horizontal direction, whereas lengths of the power/ground lines 242 are substantially identical in the vertical direction. However, a length of the horizontal power/ground line of the independent power/ground mesh 250 would not exceed the length of the system power/ground lines 241, the vertical power/ground line of the independent power/ground mesh 250 would not exceed the length of the system power/ground lines 242 either.

Since the independent power/ground mesh 250 is basically aligned with the signal path 230, it can easily power the buffers 260_1-260_4 placed on the signal path 230. In addition, the signal path 230 is basically routed around the center region of the integrated circuit 200. Hence, with proper arrangement and configuration (for example, routing based on a shortest path between the signal source 210 and the receiving terminal 220), a total length of the signal path 230 would not exceed a sum of a horizontal distance W and a vertical distance L between the signal source 210 and the receiving terminal 220. This guarantees that the routing method of the present invention can always obtain a shorter signal transmission path.

After the above steps have completed, the flow goes to the step 330, in which the APR tool can route the power and signal to the load according to the determined routing structure of the independent power/ground mesh 250 and the signal path 230. The above-mentioned flow can apply to signal transmission between one signal source and one receiving terminal as well as signal transmissions between one signal source and multiple receiving terminals. In another embodiment of the present invention, the signal generated by the signal source 210 could be further provided to a receiving terminal 221. In such embodiment, step 310 is also performed to determine a signal path 231 and turning points thereon, and place the buffers 260_5-260_6 to drive the signal to be transmitted. In addition, step 320 is performed to determine the routing structure of an independent power/ground mesh 255. In one-to-many signal transmissions, multiple sets of independent power/ground meshes 250 and 255 are contemplated and arranged to protect signal transmissions respectively on different signal paths.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The above-mentioned routing method and steps therein may be implemented through pure software architecture, a pure hardware circuit, or through a combination of the both. For instance, the routing method and steps may be implemented through a processor that performs the corresponding software, through a pure hardware circuit, or through a combination of both. The processor may be a general-purpose processor or a specific processor such as a digital signal processor. The software may be stored in a computer readable medium, such as, an optical disc, a hard disk, a flash memory, a random access memory (RAM), a read-only memory (ROM), or any other storage device which may be identified by the processor, and the software may include all kinds of programmable logics, instructions, or necessary information for the implementation of the present invention. In addition, a specific circuit realized by a hard-wired logic, a programmable logic (e.g., Field Programmable Gate Array, FPGA), a Complex Programmable Logic Device (CPLD), or an application-specific integrated circuit (ASIC) may be included in the pure hardware circuit architecture.

In conclusion, the present invention is suitable for a use in arrangement of signal transmission path in the integrated circuit regarding signals needs to be especially protected, such as signal transmission regarding clock signals. This is because the clock signal affects the performance of specific circuit elements, or even the overall performance of the integrated circuit. Further, using the deep well region can isolate the noises, such that placing and routing regarding other circuit elements does not need to yield to the routing of the clock signal source and the clock receiving terminal. As a result, routing of other circuit elements can be more flexible, which effectively addresses the problem encountered by the conventional routing method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A routing method for an integrated circuit, comprising:
   determining a signal path between a signal source and a corresponding receiving terminal according to a routing structure of a system power/ground mesh;
   placing at least one buffer along the signal path for buffering a signal generated by the signal source;
   disposing a deep well region corresponding to the at least one buffer in a substrate of the integrated circuit;
   determining a routing structure of an independent power/ground mesh that is independent from the system power/ground mesh according to the signal path; and
   performing a routing process according to the determined routing structure of the independent power/ground mesh and the signal path;
   wherein the system power/ground mesh and the independent power/ground mesh are respectively coupled to different voltage sources; and at least one portion of the routing structure of the independent power/ground mesh is aligned with the signal path.

2. The method of claim 1, wherein an independent power/ground line of the independent power/ground mesh is located between two neighboring system power/ground lines of the system power/ground mesh that are in an identical direction.

3. The method of claim 1, wherein the signal source is arranged to generate a clock signal.

4. The method of claim 1, wherein the system power/ground mesh includes a plurality of system power/ground lines arranged in a reference direction, each one of which has a first length, and one of independent power/ground lines of the independent power/ground mesh in the reference direction has a second length that is not longer than the first length.

5. The method of claim 1, wherein the signal source is separated from the receiving terminal by a first distance in a horizontal direction, and by a second distance in a vertical direction; and a total length of the signal path is substantially identical to a sum of the first distance and the second distance.

6. The method of claim 1, wherein the system power/ground mesh and the independent power/ground mesh are formed by an identical metal layer.

7. An integrated circuit, comprising:
   a system power/ground mesh;
   a signal source;
   a receiving terminal, a signal path being placed between the receiving terminal and the signal source, wherein the signal path is determined according to a layout of the system power/ground mesh;
   at least one buffer, disposed along the signal path, arranged to buffer a signal generated by the signal source;

a substrate, having a deep well region corresponding to the at least one buffer;

an independent power/ground mesh, wherein a layout of the independent power/ground mesh is determined according to the signal path;

wherein the system power/ground mesh and the independent power/ground mesh are respectively connected to different voltage source; and at least one portion of the routing structure of the independent power/ground mesh is aligned with the signal path.

8. The integrated circuit of claim 7, wherein an independent power/ground line of the independent power/ground mesh is located between two neighboring system power/ground lines of the system power/ground in an identical direction.

9. The integrated circuit of claim 7, wherein the signal source is utilized for generating a clock signal.

10. The integrated circuit of claim 7, wherein the system power/ground mesh includes a plurality of system power/ground lines arranged in a reference direction, each one of which has a first length, and one of independent power/ground lines of the independent power/ground mesh in the reference direction has a second length that is not longer than the first length.

11. The integrated circuit of claim 7, wherein the signal source is separated from the receiving terminal by a first distance in a horizontal direction, and by a second distance in a vertical direction; and a total length of the signal path is substantially identical to a sum of the first distance and the second distance.

12. The integrated circuit of claim 7, wherein the system power/ground mesh and the independent power/ground mesh are formed by an identical metal layer.

* * * * *